(12) United States Patent
Kobayashi et al.

(10) Patent No.: US 10,518,738 B2
(45) Date of Patent: Dec. 31, 2019

(54) SIDE AIRBAG DEVICE

(71) Applicant: AUTOLIV DEVELOPMENT AB, Vargarda (SE)

(72) Inventors: Yuto Kobayashi, Yokohama (JP); Hiroyuki Taguchi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 148 days.

(21) Appl. No.: 15/762,341

(22) PCT Filed: Sep. 16, 2016

(86) PCT No.: PCT/JP2016/077522
§ 371 (c)(1),
(2) Date: Mar. 22, 2018

(87) PCT Pub. No.: WO2017/057073
PCT Pub. Date: Jun. 4, 2017

(65) Prior Publication Data
US 2018/0297549 A1    Oct. 18, 2018

(30) Foreign Application Priority Data
Sep. 29, 2015    (JP) .................................. 2015-190770

(51) Int. Cl.
*B60R 21/233*    (2006.01)
*B60R 21/2338*    (2011.01)
(Continued)

(52) U.S. Cl.
CPC .......... *B60R 21/233* (2013.01); *B60R 21/207* (2013.01); *B60R 21/239* (2013.01);
(Continued)

(58) Field of Classification Search
CPC ............ B60R 21/233; B60R 21/23138; B60R 21/207; B60R 21/2338; B60R 2021/0032;
(Continued)

(56) References Cited

U.S. PATENT DOCUMENTS 9,056,591 B2    6/2015    Fujiwara
9,849,857 B2    12/2017    Fujiwara
(Continued)

FOREIGN PATENT DOCUMENTS

CA    2 917 119 A1    1/2015
CN    104093606 A    10/2014
(Continued)

OTHER PUBLICATIONS

International Search Report of PCT/JP2016/077522, dated Dec. 20, 2016.

*Primary Examiner* — Karen Beck
(74) *Attorney, Agent, or Firm* — Brinks Gilson & Lione

(57) ABSTRACT

A side airbag device 100 includes: a main bag 120, is built in a seat of a vehicle, and inflates and deploys toward a side of an occupant and a vehicle front side; an inner bag 122 which is formed in a bag shape independent of the main bag 120, and inflates and deploys on a vehicle rear side inside the main bag 120. An inflator 110 provided inside the inner bag 122 to supply gas; and a tension member 126 which spans between the vehicle front side and the vehicle rear side inside the inner bag 122 and is tensioned as the inner bag 122 inflates and deploys. The length of the inner bag 122 in the front-back direction of the vehicle at inflation is restricted by the tension member 126 to a predetermined range, and the inner bag therefore inflates in a vehicle width direction and pushes and spreads the vehicle rear side of the main bag 120 from the inside of the main bag 120 to both sides in the vehicle width direction.

8 Claims, 6 Drawing Sheets

(51) Int. Cl.
  *B60R 21/207*  (2006.01)
  *B60R 21/239*  (2006.01)
  *B60R 21/26*   (2011.01)
  *B60R 21/00*   (2006.01)

(52) U.S. Cl.
  CPC .......... *B60R 21/2338* (2013.01); *B60R 21/26* (2013.01); *B60R 2021/0032* (2013.01); *B60R 2021/23308* (2013.01); *B60R 2021/23382* (2013.01)

(58) Field of Classification Search
  CPC ........................................... B60R 2021/23382; B60R 2021/23146; B60R 2021/23332
  See application file for complete search history.

(56) References Cited

U.S. PATENT DOCUMENTS

| | | | |
|---|---|---|---|
| 2014/0035264 A1* | 2/2014 | Fukushima | B60R 21/23138 280/730.2 |
| 2014/0138939 A1* | 5/2014 | Scott | B60R 21/207 280/736 |
| 2015/0014970 A1 | 1/2015 | Fujiwara | |
| 2016/0107604 A1 | 4/2016 | Fujiwara | |
| 2018/0297549 A1* | 10/2018 | Kobayashi | B60R 21/207 |

FOREIGN PATENT DOCUMENTS

| | | |
|---|---|---|
| CN | 105377638 A | 3/2016 |
| DE | 10 2015 117 329 A1 | 4/2016 |
| EP | 2 810 831 A1 | 12/2014 |
| EP | 3 018 012 B1 | 4/2017 |
| JP | 2016-078768 A | 5/2016 |
| KR | 10-2016-0014022 A | 2/2016 |
| WO | WO 2013/114591 A1 | 8/2013 |
| WO | WO 2015/001912 A1 | 1/2015 |

\* cited by examiner (a)

(b)

CROSS SECTION A-A (a)

(b)

(a)

CROSS SECTION B-B (b)

CROSS SECTION C-C

SIDE AIRBAG DEVICE

CROSS-REFERENCE TO RELATED APPLICATIONS

This application is a 35 U.S.C. § 371 national phase application of PCT International Application No. PCT/JP2016/077522, filed Sep. 16, 2016, which claims the benefit of priority under 35 U.S.C. § 119 to Japanese Patent Application No. 2015-190770, filed Sep. 29, 2015, the contents of which are incorporated herein by reference in their entirety.

FIELD OF THE INVENTION

The present invention relates to a side airbag device including a bag-shaped airbag cushion which inflates and deploys toward a side of an occupant of a seat of a vehicle.

BACKGROUND

Airbag devices have become almost standard equipment in recent motor vehicles. An airbag device is a safety device that operates during an emergency such as a vehicle collision, and inflates and deploys an airbag cushion (hereinafter simply referred to as "cushion") with a gas pressure to receive and protect an occupant. Airbag devices come in various types in accordance with installation locations or applications. For example, in order to protect a driver from impact in the front-back direction (frontal impact), a front airbag device is provided at the center of a steering wheel. In addition, in order to protect the occupant from impacts in the vehicle width direction (side impact) which are caused by a side collision or the like, a curtain airbag device is provided in the vicinity of a ceiling (roof) above a side window, and a side airbag device is provided in a side portion of a seat.

The shape and structure of the airbag cushion are set in consideration of various situations and circumstances. For example, the airbag cushion of the side airbag disclosed in Japanese translation of PCT Application No. PCT/2010-535121 has a double structure including a tube (48) inside an airbag (18). This tube (48) is a part that can be used as a pre-push bag described hereinbelow.

A pre-push bag (also referred to as pre-crash bag) is a mechanism developed to control the impact that can be received by an occupant from the main airbag cushion. The pre-push bag has a bag-shaped structure independent of the overall airbag cushion, and is provided on the inner side of the airbag cushion, the occupant side, and the like. The pre-push bag inflates, deploys and comes into contact with the occupant earlier than the entire airbag cushion. The pre-push bag pushes back the occupant to a certain extent in advance, in order to provide enhanced restraint performance by reducing the force of impact with the entire airbag cushion.

The airbag cushion of the side airbag device is mainly built in the outer side (vehicle outer side) of the seat back in the vehicle width direction, and when an emergency occurs, the airbag cushion ruptures the surface material of the seat back and inflates and deploys in the interior space. An effective method of improving the pre-push function to attain more complete protection of the occupant is to efficiently rupture the surface material of the seat back and cause the pre-push bag to appear in the interior space quickly and smoothly.

In view of such problems, it is an object of the present invention to provide a side airbag device that enables enhanced occupant protection.

SUMMARY

In order to solve the above problem, a typical configuration of a side airbag device according to embodiments of the present invention includes: a main bag which is formed in a bag shape, is built in a seat of a vehicle, and inflates and deploys toward a side of an occupant and a vehicle front side. An inner bag is provided which is formed in a bag shape independent of the main bag, and inflates and deploys on a vehicle rear side inside the main bag. An inflator is provided inside the inner bag to supply gas; and a tension member is provided which spans between the vehicle front side and the vehicle rear side inside the inner bag and is tensioned as the inner bag inflates and deploys. A length of the inner bag in a front-back direction of the vehicle at the time of inflation is restricted by the tension member to a predetermined range, and due to the restriction, the inner bag further inflates in a vehicle width direction and pushes and spreads the vehicle rear side of the main bag from the inside of the main bag to both sides in the vehicle width direction.

With the above-described configuration, the inner bag functions as a pre-push bag, and the inner bag inflates and deploys earlier than the main bag. Since the inflation of the inner bag in the front-back direction of the vehicle is restricted by the tension member, the inner bag further inflates in the vehicle width direction. Therefore, the inner bag opens the surface covering material of the seat wider, and can inflate and deploy quickly and smoothly to the space inside the vehicle. Thus, according to the above configuration, the inner bag can be efficiently brought into contact with the occupant to push back the occupant, thereby potentially enhancing occupant protection.

The tension member may span between a front end portion inside the inner bag and a predetermined position which is on the vehicle rear side posterior to the front end portion.

With the above-described configuration, since the inflation of the inner bag in the front-back direction of the vehicle is also restricted by the tension member, the inner bag further inflates in the vehicle width direction. Therefore, the inner bag opens the surface cover material of the seat wider, and can inflate and deploy quickly and smoothly to the space inside the vehicle. Thus, according to the above configuration, the inner bag can be efficiently brought into contact with the occupant to push back the occupant, thereby potentially contributing to occupant protection.

The tension member may span between a rear end portion inside the inner bag and a predetermined position which is on the vehicle front side anterior to the rear end portion.

With the above-described configuration, since the inflation of the inner bag in the front-back direction of the vehicle is also restricted by the tension member, the inner bag further inflates in the vehicle width direction. Therefore, the inner bag opens the surface cover material of the seat wider, and can inflate and deploy quickly and smoothly to the space inside the vehicle. Thus, according to the above configuration, the inner bag can be efficiently brought into contact with the occupant to push back the occupant, thereby potentially enhancing occupant protection.

The tension member may include a plurality of tethers formed in a belt shape, and the plurality of tethers may span the inside of the inner bag from one point on one side in the front-back direction of the vehicle to a plurality of positions on the other side. With this configuration, it is also possible to restrict the inflation of the inner bag in the front-back direction of the vehicle and to inflate the inner bag to a greater thickness in the vehicle width direction.

According to the present invention, it is possible to provide a side airbag device that potentially enables enhanced occupant protection.

DETAILED DESCRIPTION

Figure 1:
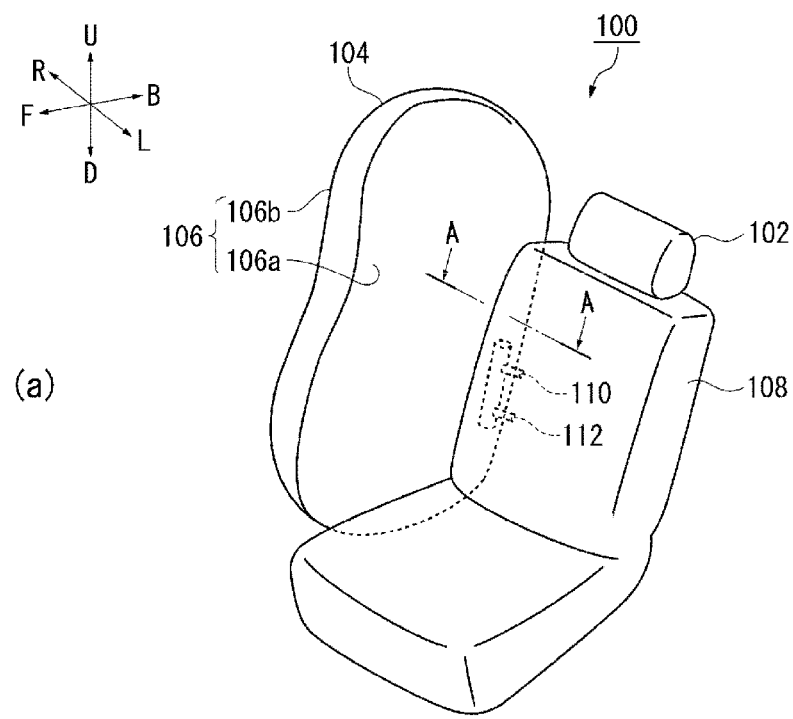
FIGS. 1(a) and 1(b) are views illustrating a side airbag device according to an embodiment of the present invention.
Figure 1:
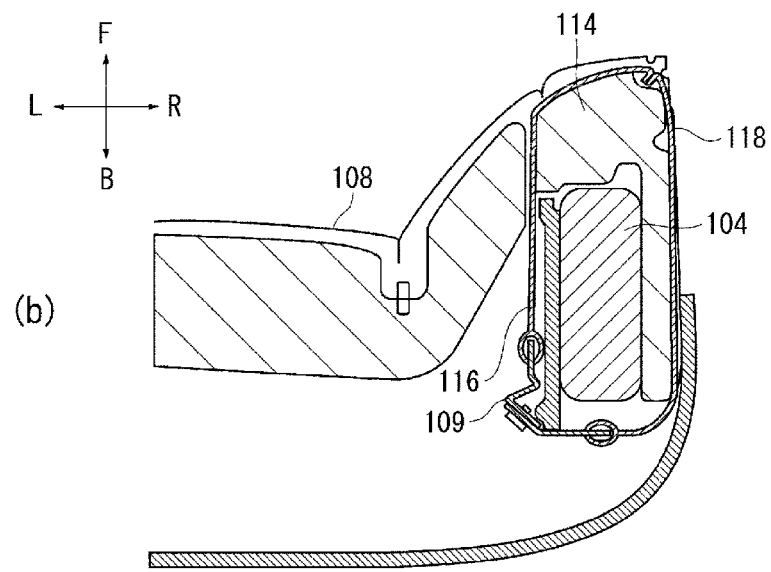

Preferred embodiments of the present invention will now be described in detail with reference to the accompanying drawings. The dimensions, materials, and also numerical values and the like shown in such embodiments are merely exemplary and serve to facilitate understanding of the invention, and the present invention is not limited thereto unless otherwise noted. In the specification and the drawings, elements having substantially the same function and configuration are denoted by the same reference numerals, and redundant explanation thereof is omitted. Elements not directly related to the present invention are not shown in the drawings.

FIGS. 1(a) and 1(b) are diagrams illustrating a side airbag device 100 according to an embodiment of the present invention. In FIG. 1(a), the side airbag device 100 and a seat 102 on the vehicle right side at which the side airbag device 100 is used are illustrated from the inside in the vehicle width direction (inside the vehicle). In FIG. 1(a) and all other drawings of the present application, the forward and backward directions of the vehicle are indicated by arrows F (Forward) and B (Back), the left and right in the vehicle width direction are indicated by arrows L (Left) and R (Right) and the vertical up and down are indicated by arrows U (up) and D (down), respectively.

As shown in FIG. 1(a), the side airbag device 100 is configured such that the airbag cushion 104 is inflated and deployed on the side of the seat 102. The cushion 104 is a bag-shaped portion that contacts the occupant in the event of an emergency, such as when an impact is generated on the vehicle, and the cushion is inflated and deployed in a flat shape between the occupant (not shown) of the seat 102 and a door trim.

The outer surface of the cushion 104 is constituted by main panels 106 (main panels 106a, 106b). The main panels 106 are made of a base cloth and formed into a bag shape by sewing, adhesive bonding, or the like.

The cushion 104 is rolled or folded and stored in a predetermined storage section provided on the side portion of the seatback 108. Since the surface cover material of the seatback 108 covers the cushion 104 from above in the stored state, the cushion cannot be seen from the outside during normal vehicle operation. When the side airbag device 100 is deployed, the cushion 104 ruptures the surface material 118 (FIG. 1(b)), and inflates and deploys to the side of the occupant, and restrains the occupant from the side.

An inflator 110 is a gas generating apparatus which operates upon receiving an operation signal transmitted from the vehicle when an impact occurs, and supplies gas to the interior of the cushion 104. The inflator 110 used in the present described embodiment is a cylinder-type (cylinder-like) inflator and is installed on the vehicle rear side inside the cushion 104, with the front-back direction of the inflator being oriented in the vertical direction. The inflator 110 is provided with a stud bolt 112. The stud bolt 112 penetrates the cushion 104 and is fastened to the internal part, or the like, on the side portion of the seatback 108.

The following types of inflators are presently widely used: a type in which a gas generating agent is filled and burned to generate a gas, a type in which compressed gas is filled and a gas is supplied without generating heat, and a hybrid type using both combustion gas and compressed gas. An inflator of any type can be used as the inflator 110.

FIG. 1(b) is a view illustrating the state of the cushion 104 shown in FIG. 1(a) when it is stored. FIG. 1(b) corresponds to the A-A cross section of the seatback 108 in FIG. 1(a). As shown in FIG. 1(b), the cushion 104 is packaged and stored in the side portion of the seatback 108 and attached to a metal plate 109 which is an inner member of the seatback 108. The vehicle front side and vehicle outer side of the cushion 104 are covered with a surface material 118 such as a urethane foam 114 and a stay cloth 116.

Figure 2:
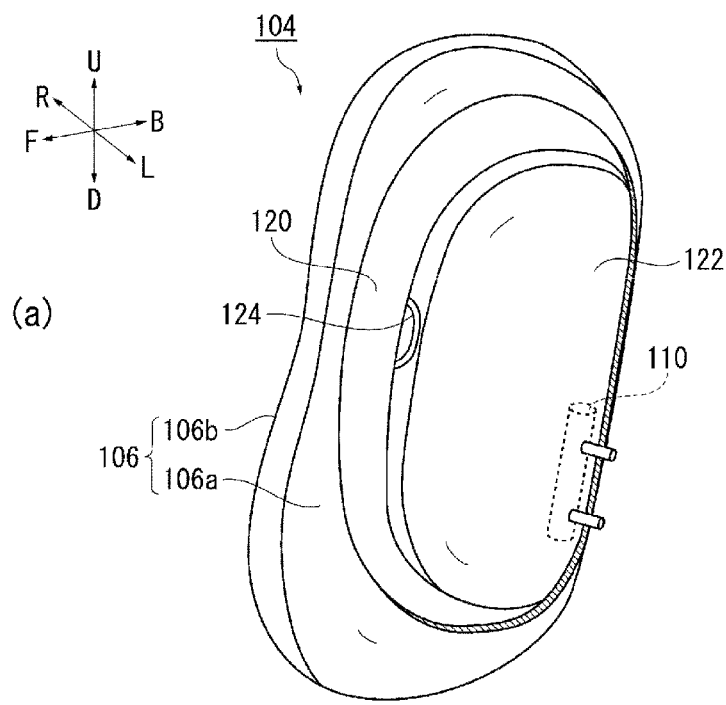
FIGS. 2(a) and 2(b) are views illustrating the inside of the cushion shown in FIG. 1(a).
Figure 2:
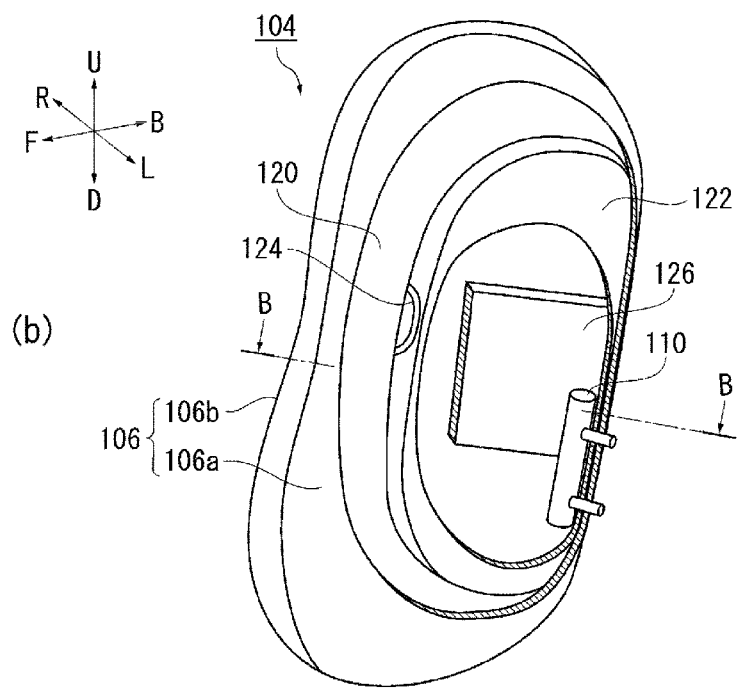

FIGS. 2(a) and 2(b) are views showing the inside of the cushion 104 shown in FIG. 1(a). In FIG. 2(a), part of the main panel 106a on the vehicle inner side of the cushion 104 is omitted to show the internal configuration of the cushion.

The cushion 104 has a double structure constituted by a main bag 120 on the outer side and an inner bag 122 on the inner side. The main bag 120 and the inner bag 122 are each formed in a bag shape.

The main bag 120 constitutes an outer shell of the cushion 104, and inflates and deploys from the seat 102 (see FIG. 1(a)) to the side of the occupant and the vehicle front side.

The inner bag 122 is a bag-shaped structure independent of the main bag 120 and is provided on the vehicle rear side inside the main bag 120. The inner bag 122 encloses the inflator 110, initially receives the gas from the inflator 110, and inflates and deploys before the main bag 120.

A vent hole 124 is provided in the inner bag 122, and a gas is supplied to the main bag 120 through the vent hole 124 of the inner bag 122. Although it is possible to provide separate inflators for the inner bag 122 and the main bag 120, a configuration in which the inflator 110 is shared between the inner bag 122 and the main bag 120 as in the present embodiment is advantageous in terms of cost and allows storage in a smaller space.

The inner bag 122 functions as a pre-push bag (pre-push function). The inner bag 122 inflates and deploys before the main bag 120 upon the detection of impact or advance detection of impact and inflates in the vehicle width direction and quickly acts on the occupant. The inner bag 122 pushes the occupant to a certain extent in a direction away from the collision side of the vehicle at the initial stage of deployment. As a result, the impact when the main bag 120 thereafter restrains the occupant can be further controlled, and the occupant restraint can be potentially enhanced.

The cushion 104 of the present embodiment can also reduce the harmfulness to the occupant present in an unexpected posture, for example, other than the regular seating state (a so-called out-of-position occupant). For example, when the occupant is present near the vehicle outer side of the seat, the occupant is positioned on the vehicle front side of the cushion 104, and particularly the main bag 120 of the cushion 104 is in linear contact with the occupant. However, as the inner bag 122 initially receives the inflation gas and inflates rapidly in the thickness direction (vehicle width direction) of the cushion 104, the rigidity of the main bag 120 immediately after the operation of the inflator 110 is suppressed and the input load to the out-of-position occupant can be reduced.

In FIG. 2(b), part of the inner bag 122 of FIG. 2(a) on the vehicle inner side is omitted to show the internal structure thereof. In the present embodiment, a tension member 126 is provided inside the inner bag 122. The tension member 126 pulls the inner bag 122 in the front-back direction of the vehicle. In the present embodiment, enhanced occupant protection may be enabled by a simple configuration using the tension member 126.

Figure 3:
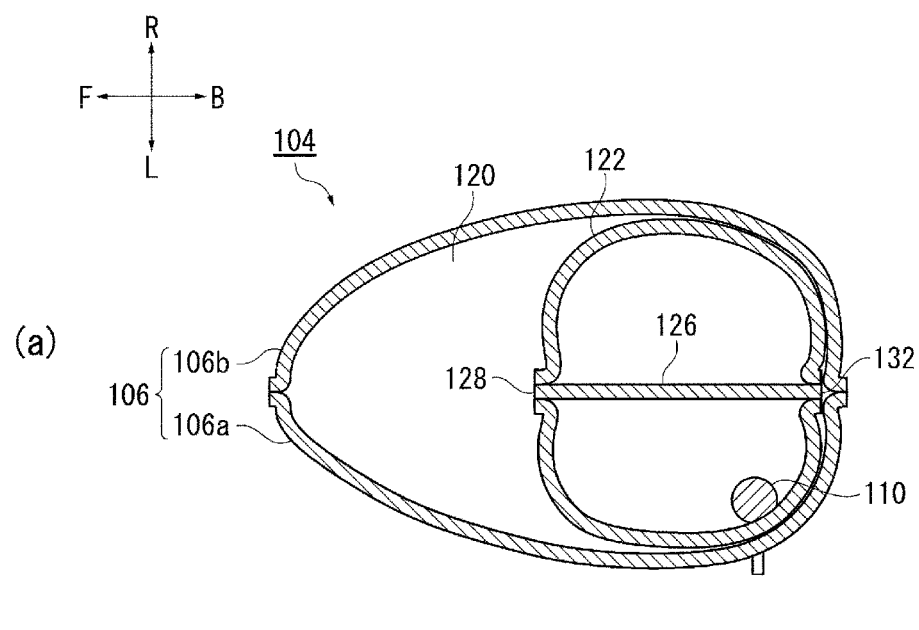
FIGS. 3(a) and 3(b) are cross-sectional views taken along the line B-B of the cushion 104 shown in FIG. 2(b).
Figure 3:
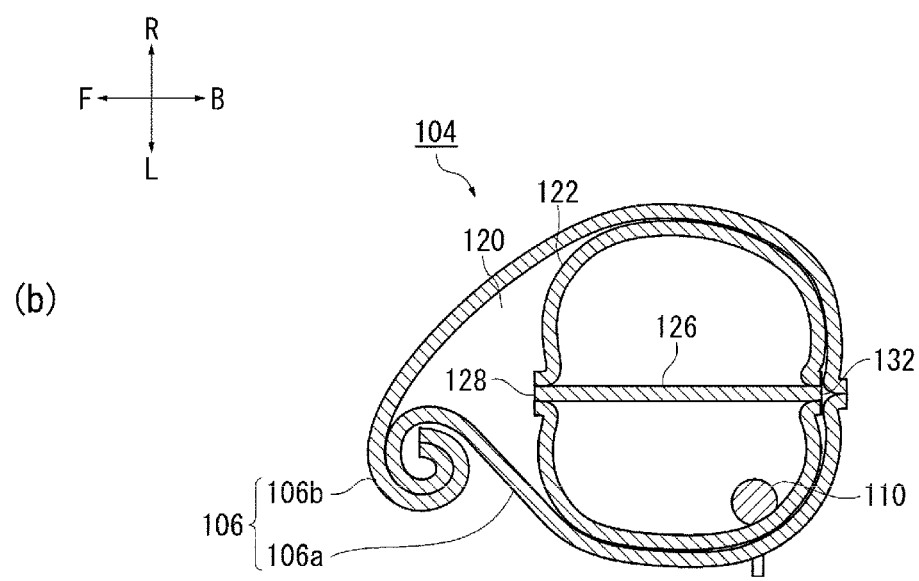

FIGS. 3(a) and 3(b) are cross-sectional views of the cushion 104 taken along the line B-B in FIG. 2(b). Similarly to FIG. 2(b), FIG. 3(a) illustrates the cushion 104 at the time of inflation and deployment. The tension member 126 is formed by using a base cloth or the like and spans the inside of the inner bag 122 in the front-back direction of the vehicle between the front end portion 128 of the inner bag 122 on the vehicle front side and a rear end portion 132 of the inner bag which is on the vehicle rear side posterior to the front end portion 128.

As the inner bag 122 inflates and deploys, the tension member 126 is tensioned in the front-back direction of the vehicle and pulls the inner bag 122 in the front-back direction of the vehicle. In other words, the length from the portion of the tension member 126 which is joined to the front end portion 128 to the portion joined to the rear end portion 132 is set shorter than the distance between the front end portion 128 and the rear end portion 132 at the time of inflation when the tension member 126 is not provided.

With the abovementioned configuration, the tension member 126 pulls the front end portion 128 and the rear end portion 132 of the inner bag 122 in the front-back direction of the vehicle. The length of the inner bag 122 in the front-back direction of the vehicle at the time of inflation is restricted by the tension member 126 to a predetermined range, and the inner bag 122 inflates so as to become thicker in the vehicle width direction by that amount.

The inner bag 122 has a bag-shaped configuration independent of the main bag 120, and the surface of the base cloth of the inner bag 122 can slide on the inner surface of the base cloth of the main bag 120. Therefore, the inflating main bag 120 produces little effect on the inner bag 122, and the inner bag can inflate and deploy by moving independently of the main bag 120.

The outer shape of the main bag 120 on the vehicle rear side is affected by the shape of the inner bag 122 at the time of inflation. The vehicle rear side of the main bag 120 is pushed and spread from the inside to both sides in the vehicle width direction by the inner bag 122 and inflates to be thicker in the vehicle width direction. The thickness of the main bag 120 in the vehicle width direction on the vehicle rear side in the present embodiment is larger than the thickness of the main bag in the vehicle width direction on the vehicle rear side in examples of the conventional configuration which is not provided with the inner bag 122.

FIG. 3(b) is a view illustrating an initial state of inflation and deployment of the cushion 104 shown in FIG. 3(a). The main bag 120 of the present embodiment has the above-described inner bag 122, so that the thickness of the main bag in the vehicle width direction on the vehicle rear side quickly increases at the initial stage of inflation and deployment. As a result, the above-described pre-push function is realized.

Figure 4:
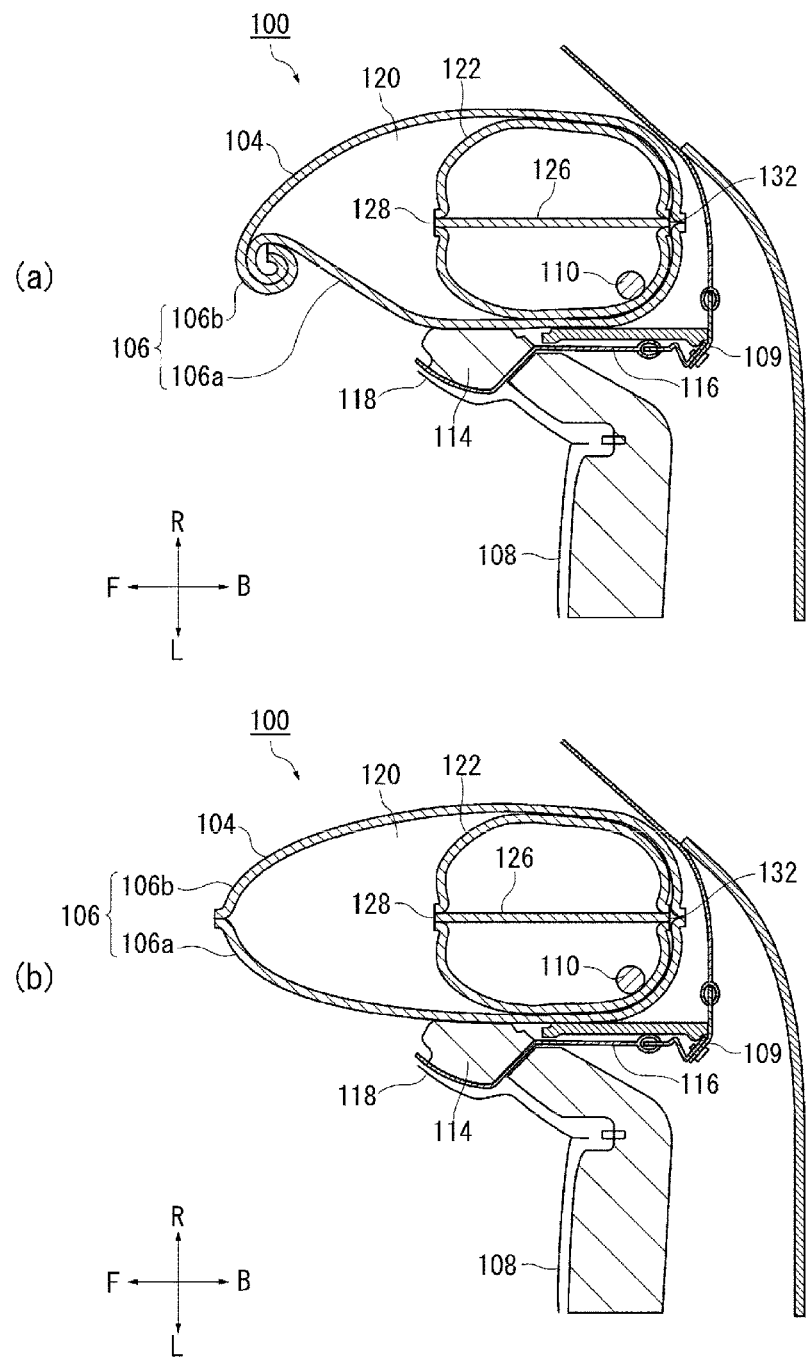
FIGS. 4(a) and 4(b) are views illustrating the process of inflating and deploying the cushion 104 shown in FIG. 1(b).

FIGS. 4(a) and 4(b) are views illustrating a process in which the cushion 104 shown in FIG. 1(b) is inflated and deployed. FIG. 4(a) illustrates the initial stage of inflation and deployment of the cushion 104. As shown in FIG. 4(a), the thickness of the main bag 120 in the vehicle width direction on the vehicle rear side is rapidly increased by the inner bag 122 before the entire main bag 120 inflates and deploys. Therefore, as a pre-push function, the vehicle rear side of the main bag 120 can push the occupant away from the collision side of the vehicle at an early stage after the detection of the impact and the pre-detection of the impact.

FIG. 4(b) is a view illustrating the process of inflation and deployment of the cushion 104 following the initial stage shown in FIG. 4(a). At the initial stage of inflation and deployment shown in FIG. 4(a), the inner bag 122 inflates to be thicker in the vehicle width direction under the effect of the tension member 126, so that the surface material 118 of the seat 102 can be opened more widely. Therefore, not only it is possible to realize advantageously the pre-push function by the inner bag 122, but it is also possible to inflate and deploy the main bag 120 quickly and smoothly into the inner space of the vehicle as shown in FIG. 4(b).

As described above, according to the present embodiment, the inner bag 122 can be caused to act on the occupant so as to push the occupant at the initial stage of inflation and deployment, thereby providing occupant protection from an earlier time point after the collision. In addition, since the occupant protection performance is improved with a simple configuration using the tension member 126, this embodiment is effective in terms of labor and cost as compared to the case where a similar effect is attained by changing the shape of the cushion 104 itself or changing the inflator 110 to be used.

Figure 5:
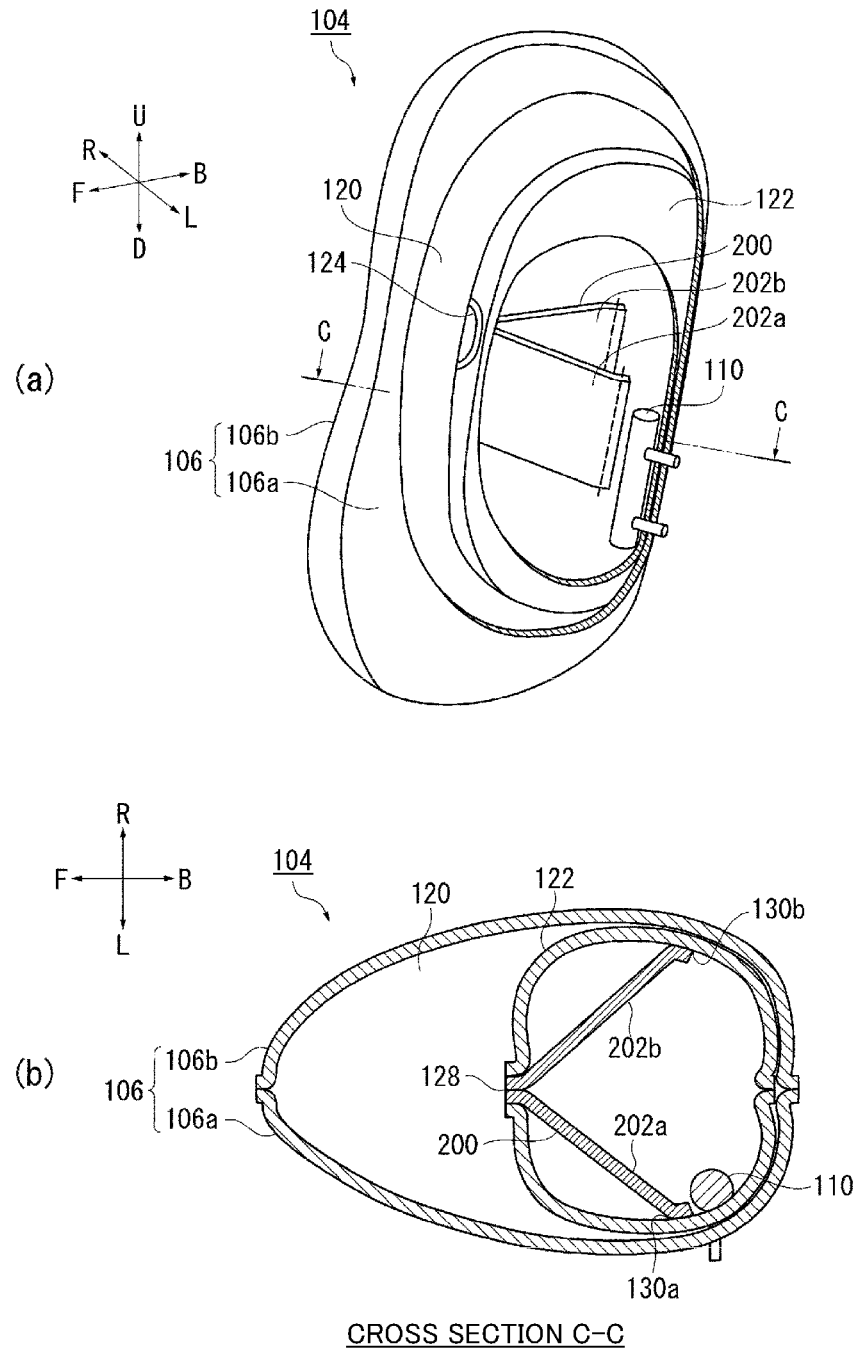
FIGS. 5(a) and 5(b) are views illustrating a first modification example of a tension member 126 shown in FIG. 2(b).

FIGS. 5(a) and 5(b) are views illustrating a first modification example of the tension member 126 illustrated in FIG. 2(b). In the following description, the already described components are assigned with the same reference numerals, and the description thereof is omitted. Even in the case of components assigned with different reference numerals, those having the same names as the already described components are assumed to have the same configuration and function.

FIG. 5(a) is a view illustrating a tension member 200 corresponding to FIG. 2(b). The tension member 200 is configured of two tethers 202a, 202b formed in a belt shape. The tethers 202a, 202b span the inside of the inner bag 122 from the front side to two places on the rear side in the front-back direction of the vehicle.

FIG. 5(b) is a cross sectional view taken along the line C-C in FIG. 5(a). The tethers 202a, 202b span between one point on a front end portion 128 of the inner bag 122 in the front-back direction of the vehicle and two places, namely, side portions 130a, 130b, on the vehicle rear side posterior to the front end portion 128.

The tethers 202a, 202b are tensioned as the inner bag 122 inflates and deploys. At this time, the tether 202a pulls the front end portion 128 of the inner bag 122 and the side portion 130a on the vehicle inner side, and the tether 202b pulls the front end portion 128 of the inner bag 122 and the side portion 130b on the vehicle outer side. In this way, since the forces from the two tethers 202a, 202b concentrate at one point of the front end portion 128, the inflation of the front end portion 128 toward the front side of the vehicle is restricted, and the inner bag 122 inflates to a greater thickness in the vehicle width direction.

The inner bag 122 can also be inflated to a greater thickness in the vehicle width direction and the surface material 118 of the seat 102 (see FIG. 1(b)) can be opened wider by the tension member 200. Therefore, the pre-push function of the inner bag 122 is improved, and the inner bag 122 can be quickly and smoothly inflated and deployed to the inner space of the vehicle. In this manner, the pre-push function of the inner bag 122 can be improved by the tension member 200 including the plurality of tethers 202a, 202b.

Figure 6:
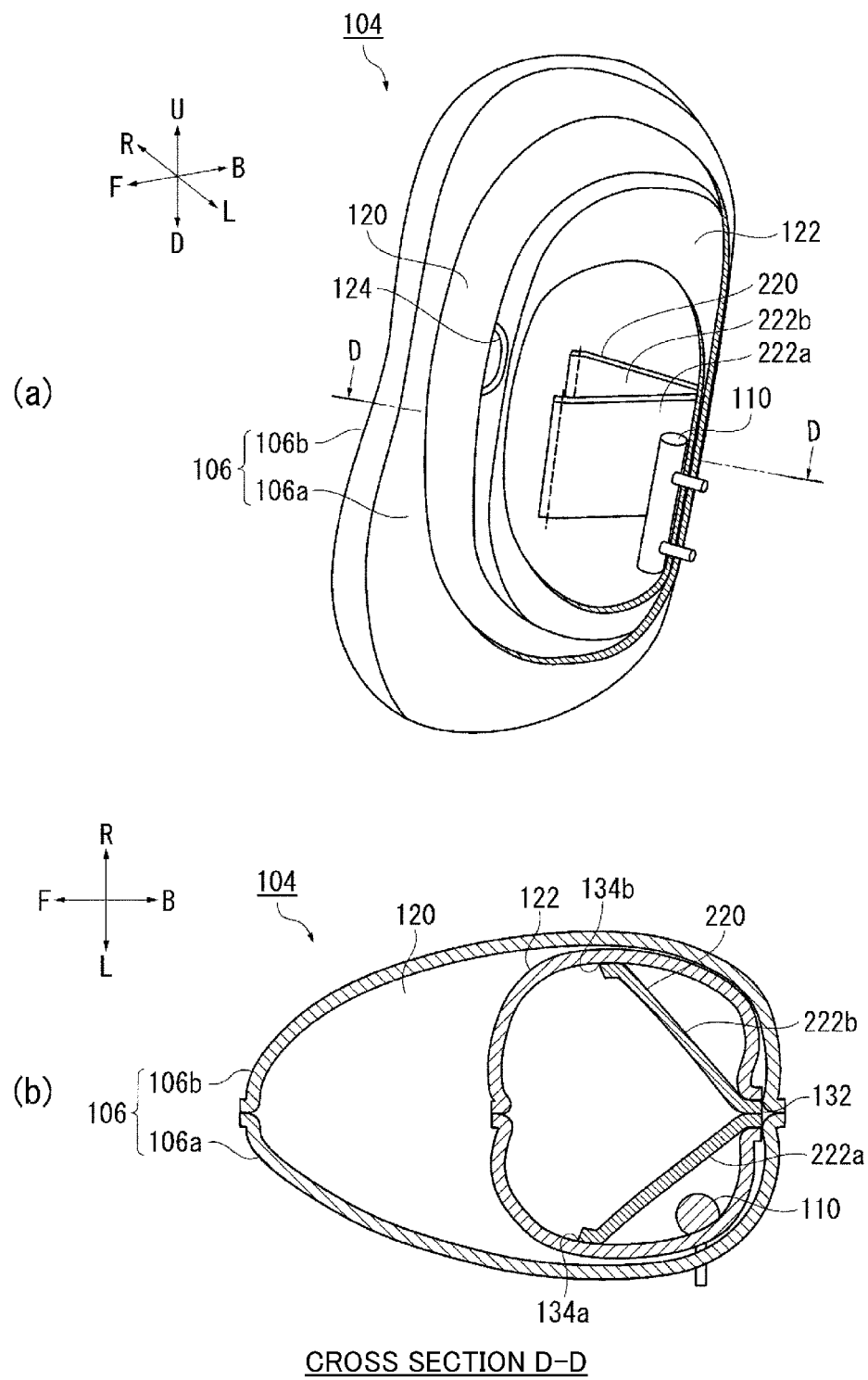
FIGS. 6(a) and 6(b) are views illustrating a second modification example of the tension member 126 shown in FIG. 2(b).

FIGS. 6(a) and 6(b) are views illustrating a second modification example of the tension member 126 illustrated in FIG. 2(b). FIG. 6(a) is a view illustrating a tension member 220 corresponding to FIG. 2(b). The tension member 220 is also configured of two tethers 222a, 222b formed in a belt shape. The tethers 222a, 222b span the inside of the inner bag 122 from the rear side to two places on the front side in the front-back direction of the vehicle.

FIG. 6(b) is a cross sectional view taken along the line D-D in FIG. 6(a). The tethers 222a, 222b span between one point on a rear end portion 132 of the inner bag 122 in the front-back direction of the vehicle and two places, namely, side portions 134a, 134b, on the vehicle front side anterior to the rear end portion 132.

The tethers 222a, 222b are tensioned as the inner bag 122 inflates and deploys. At this time, the tether 222a pulls the rear end portion 132 of the inner bag 122 and the side portion 134a on the vehicle inner side, and the tether 222b pulls the rear end portion 132 of the inner bag 122 and the side portion 134b on the vehicle outer side. In this way, since the forces from the two tethers 222a, 222b concentrate at one point of the rear end portion 132, the inflation of the rear end portion 132 toward the rear side of the vehicle is restricted, and the inner bag 122 inflates to a greater thickness in the vehicle width direction.

The inner bag 122 can also be inflated to a greater thickness in the vehicle width direction and the surface material 118 of the seat 102 (see FIG. 1(b)) can be opened wider by the tension member 220. Therefore, the pre-push function of the inner bag 122 is improved, and the inner bag 122 can be quickly and smoothly inflated and deployed to the inner space of the vehicle. In this manner, the pre-push function of the inner bag 122 can be improved by the tension member 220 including the plurality of tethers 222a, 222b.

Although the preferred embodiments of the present invention have been described above with reference to the accompanying drawings, the above-described embodiments are preferred examples of the present invention, and other embodiments can also be implemented or accomplished by various methods. Unless otherwise specified in the description of the present application, the present invention is not limited by the detailed shape, size, mutual arrangement, etc. of the parts shown in the accompanying drawings. Also, the expressions and terms used in the description of the present application are for the purpose of explanation, and are not limiting. For example, the present invention can be applied not only to a side airbag that inflates and deploys between the vehicle door and the passenger, but also to a center airbag that inflates and deploys between seats in the vehicle width direction. Further, the present invention can be applied to the side airbag and center airbag not only for the front seat, but also for the rear seat of the vehicle.

While the above description constitutes the preferred embodiment of the present invention, it will be appreciated that the invention is susceptible to modification, variation and change without departing from the proper scope and fair meaning of the accompanying claims.

The invention claimed is:

1. A side airbag device comprising:
a main bag which is formed in a bag shape, and is adapted to be stored in a seat of a vehicle, and inflates and deploys toward a side of an occupant and a vehicle front side;
an inner bag which is formed in a bag shape independent of the main bag, and inflates and deploys on a vehicle rear side inside the main bag;
an inflator which is provided inside the inner bag to supply an inflation gas; and
a tension member which spans between the vehicle front side and the vehicle rear side inside the inner bag and is tensioned as the inner bag inflates and deploys, wherein
a length of the inner bag in a front-back direction of the vehicle at the time of inflation is restricted by the tension member to a predetermined range, and due to the restriction, the inner bag further inflates in a vehicle width direction and pushes and spreads a vehicle rear side of the main bag from the inside of the main bag in the vehicle width direction.

2. The side airbag device according to claim 1, further comprising, the tension member spans between a front end portion inside the inner bag and a predetermined position which is on the vehicle rear side posterior to the front end portion.

3. The side airbag device according to claim 1, further comprising, the tension member spans between a rear end portion inside the inner bag and a predetermined position which is on the vehicle front side anterior to the rear end portion.

4. The side airbag device according to claim 1, further comprising, the tension member includes a plurality of tether sections formed in a belt shape, and the plurality of tether sections spans the inside of the inner bag from one point on one side in the front-back direction of the vehicle to a plurality of positions on another side in the front-back direction.

5. The side airbag device according to claim 2, further comprising, the tension member is formed of a single piece of fabric and extends in a longitudinal direction along the front-back direction.

6. The side airbag device according to claim 4, further comprising, the plurality of tether sections are joined together at the one point at a front end in the front-back direction and diverge extending rearward to a rear end in the front-back direction.

7. The side airbag device according to claim 4, further comprising, the plurality of tether sections are joined together at the one point at a rear end in the front-back direction and diverge extending forward to a front end in the front-back direction.

8. The side airbag device according to claim 1, further comprising, a vent hole in the inner bag for allowing the gas to inflate the main bag.

* * * * *